A. C. SARGENT.
HOLLOW SHAFT CONSTRUCTION.
APPLICATION FILED OCT. 31, 1910.
1,012,018.
Patented Dec. 19, 1911.
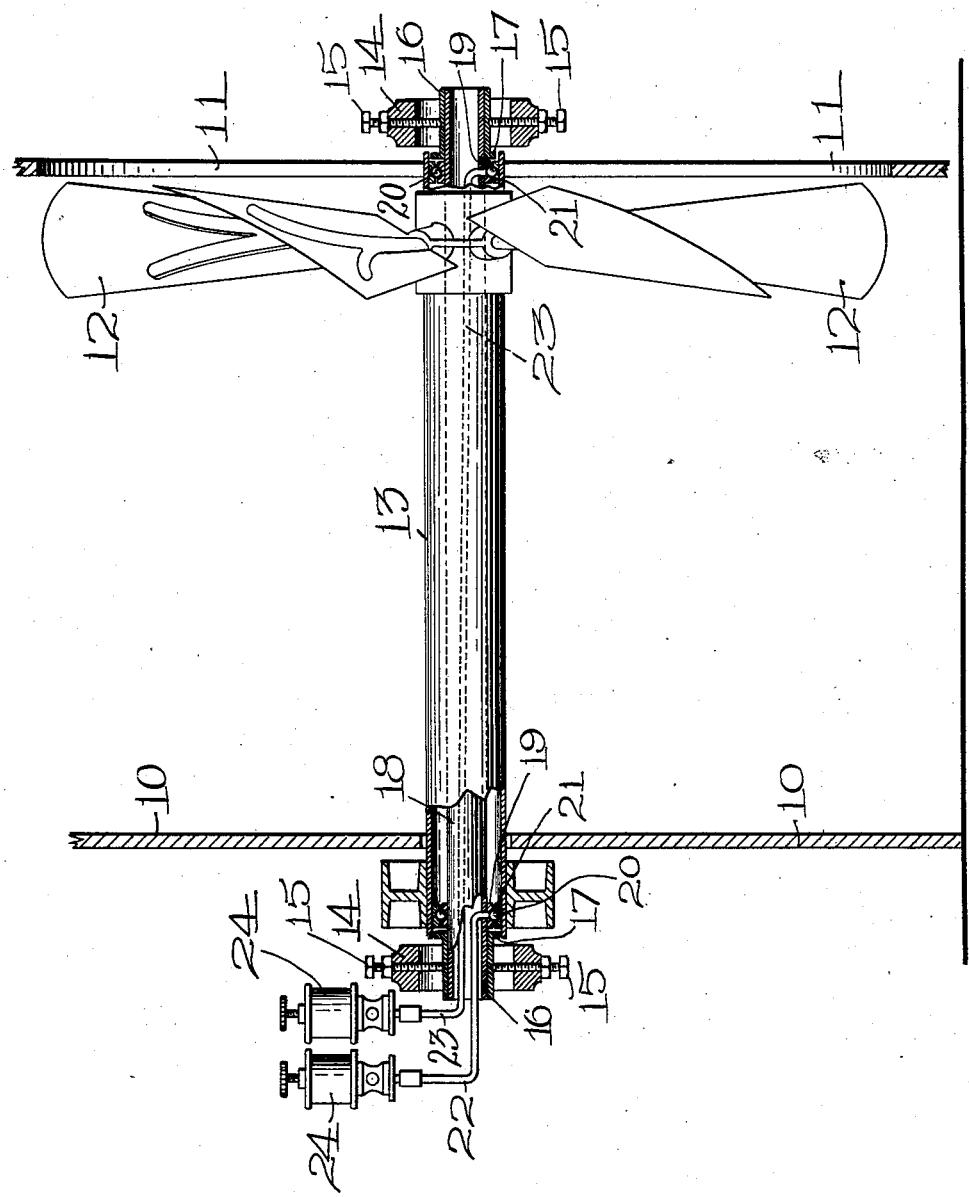

UNITED STATES PATENT OFFICE.

ALLAN CAMERON SARGENT, OF WESTFORD, MASSACHUSETTS, ASSIGNOR TO C. G. SARGENT'S SONS CORPORATION, OF GRANITEVILLE, MASSACHUSETTS, A CORPORATION OF MASSACHUSETTS.

HOLLOW-SHAFT CONSTRUCTION.

1,012,018.  Specification of Letters Patent.  Patented Dec. 19, 1911.

Application filed October 31, 1910. Serial No. 589,974.

*To all whom it may concern:*

Be it known that I, ALLAN CAMERON SARGENT, a citizen of the United States, residing at Westford, in the county of Middlesex and State of Massachusetts, have invented a new and useful Hollow-Shaft Construction, of which the following is a specification.

This invention relates to a hollow shaft construction, and the principal objects thereof are to provide means whereby the opposite ends of a hollow shaft can be rigidly supported with respect to each other, so that there will be no liability of the two end bearings getting out of alinement; to provide a construction and location of bearings connected therewith which may be air cooled during the rotation of the shaft; to provide means whereby the ends of the hollow shaft are simply and effectively closed to prevent the entrance to the bearings of dirt, dust, fibers, and the like; to provide means whereby the bearings at each end can be conveniently lubricated from one end of the shaft in a very regular manner; and generally to improve the construction of hollow shafts and their supporting means whether designed for general use or for fans in drying machines and the like.

Further objects and advantages of the invention will appear hereinafter.

Reference is to be had to the accompanying drawing which is an elevation of a hollow fan sheet constructed in accordance with this invention, parts being shown in longitudinal central section.

The invention is shown as applied to a wool drying machine having an outer wall or partition 10 and an inner inaccessible wall or partition 11 both of them perforated. In the present illustration the perforation in the partition 11 is about the diameter of a fan 12 which is mounted on the hollow shaft 13. The hollow shaft extends through both perforations. For the purpose of supporting this shaft so that the alinement of its bearings will be uniform and will not be likely to be disturbed, as well as to secure the other results above mentioned, hangers 14 are provided outside the walls or partitions having adjusting screws 15 which engage collars 16 and serve to hold them rigidly in adjusted position. Each collar is provided with a flange 17 on the inner end, the purpose of which will be described hereinafter. Fitting within the two collars is a hollow pipe 18. This pipe extends past the ends of the hollow shaft 13. It is adjustably supported by the hangers 14 as has been described. On this pipe near the ends of the hollow shaft are bearing rings 19 for supporting bearing balls 20. These bearing balls are also contained in bearing members 21 located on the inside of the hollow shaft 13 near the ends thereof and registering of course with the bearing rings 19. It is preferred to have the hollow shaft 13 project beyond these bearings and the flange 17 on the collar 16 fill the space at the end of the hollow shaft so as to prevent the entrance of dirt, dust, and especially fibers when the device is used in connection with textile industries. At the same time the pipe 18 being hollow from end to end and its ends being open, air can circulate through it, thus tending to cool the bearings to a certain degree. Another advantage of this hollow pipe 18 is that it affords a convenient place for locating oiling tubes 22 and 23 which extend into the pipe at one end. These are connected with sight feed oilers 24 of any desired construction, and one of them 22 extends into the bearing at the inner end of the pipe so as to conduct a lubricant directly into that bearing. The other one 23 extends substantially the whole length of the pipe into the bearing at the opposite end. As the pipe is stationary the oiling tube 23 preferably enters it near the top of one end and slants downwardly from that point to the opposite end so as to give a free feed to the lubricant. The other tube 22 also can have a slight inclination if desired. These sight oilers furnish a very regular means for keeping the bearings properly lubricated.

It will be seen that in addition to the advantages which have already been specified, the hollow pipe 18 constitutes a very strong support for the hollow shaft; that it affords a bearing ring on the outside of comparatively large surface which in itself reduces the tendency to heating of the bearings; that it extends from one rigid support at one end to the other rigid support at the other continuously so that there is no danger of the bearings at two ends getting out of alinement with each other; and that it affords a very simple and convenient support for the bearings and one which can be readily protected by the flanges on the collar 16.

While I have illustrated and described a preferred embodiment of the invention I am aware that many modifications can be made therein by any person skilled in the art without departing from the scope of the invention as expressed in the claim. Therefore I do not wish to be limited to all the details of construction herein shown and described, but What I do claim is:—

In a machine of the class described, the combination with a frame comprising two fixed walls or partitions, of a hollow shaft extending from one to the other and through both of them, bearings located inside said hollow shaft near its ends, one of them being inaccessibly located inside said frame, a fixed hollow support extending through the hollow shaft and projecting from its opposite ends and having an open end, means beyond and independent of said walls for rigidly and adjustably supporting the outer ends of said support, bearing rings fixed to said support and registering with the bearings in the hollow shaft, bearing balls for said bearings and bearing rings, two reservoirs for a lubricant supported at said open end of said support, and two tubes extending into said hollow support, one of them along the entire length of the same from said reservoir for lubricating the bearing at the opposite end thereof.

In testimony whereof I have hereunto set my hand, in the presence of two subscribing witnesses.

ALLAN CAMERON SARGENT.

Witnesses:
JAMES M. SARGENT,
OSBORN H. CILLEY.

Copies of this patent may be obtained for five cents each, by addressing the "Commissioner of Patents, Washington, D. C."